July 20, 1965 W. B. CRANE, JR 3,195,284
APPARATUS AND METHOD FOR FORMING AND CLOSING A DISPLAY PACKAGE
Filed Jan. 20, 1964 6 Sheets-Sheet 1
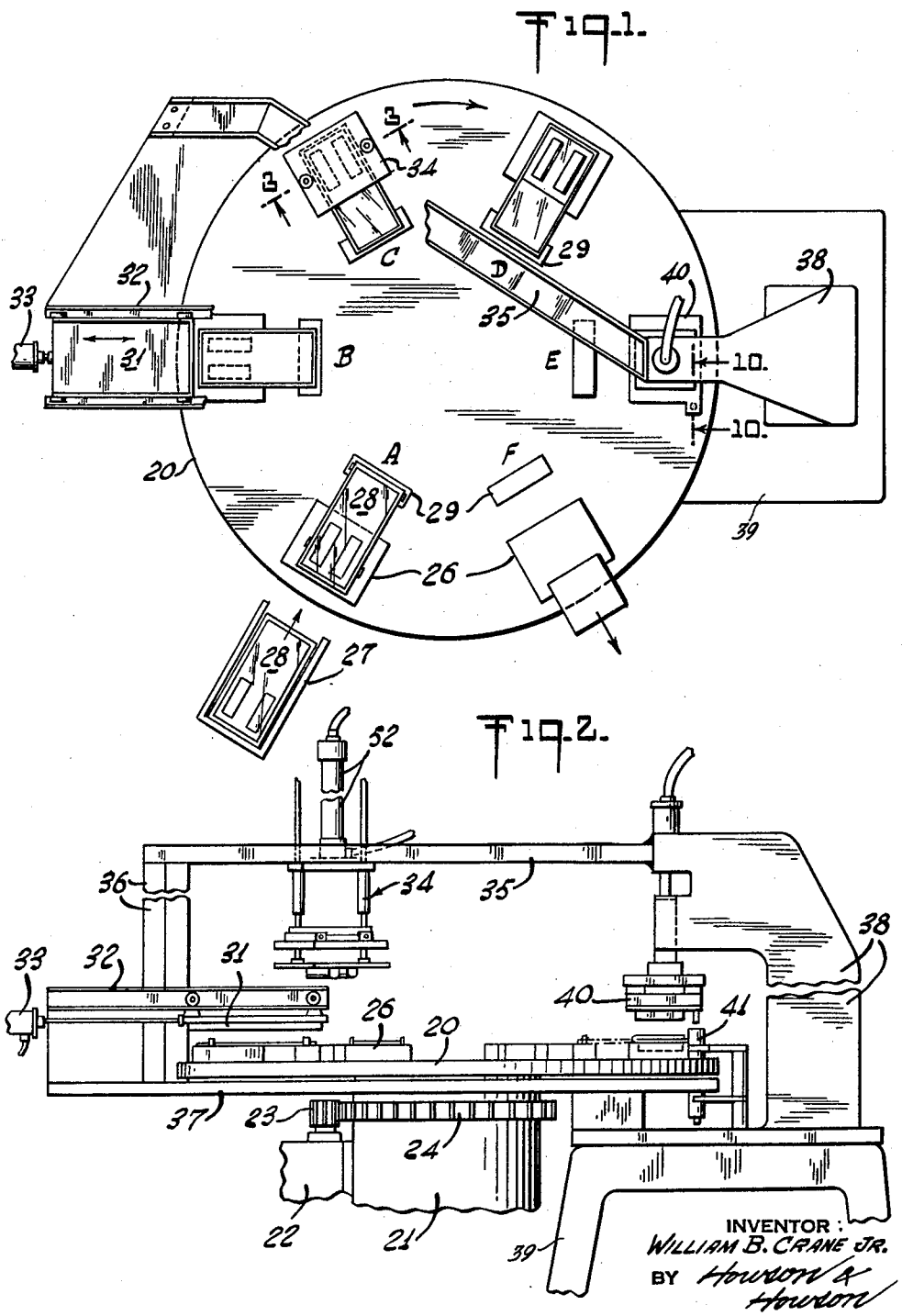
INVENTOR:
WILLIAM B. CRANE JR.
BY Howson & Howson
ATTORNEYS

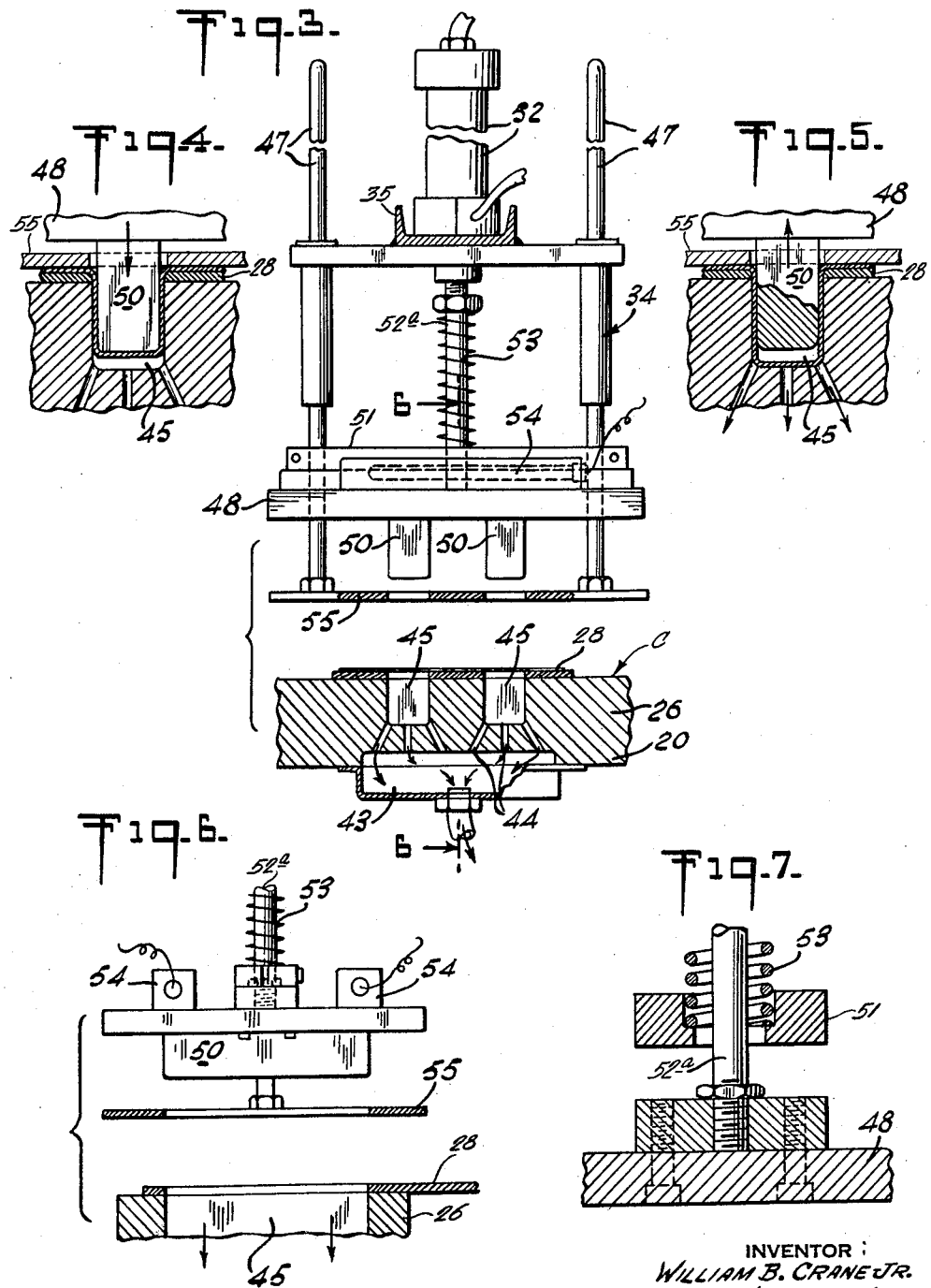

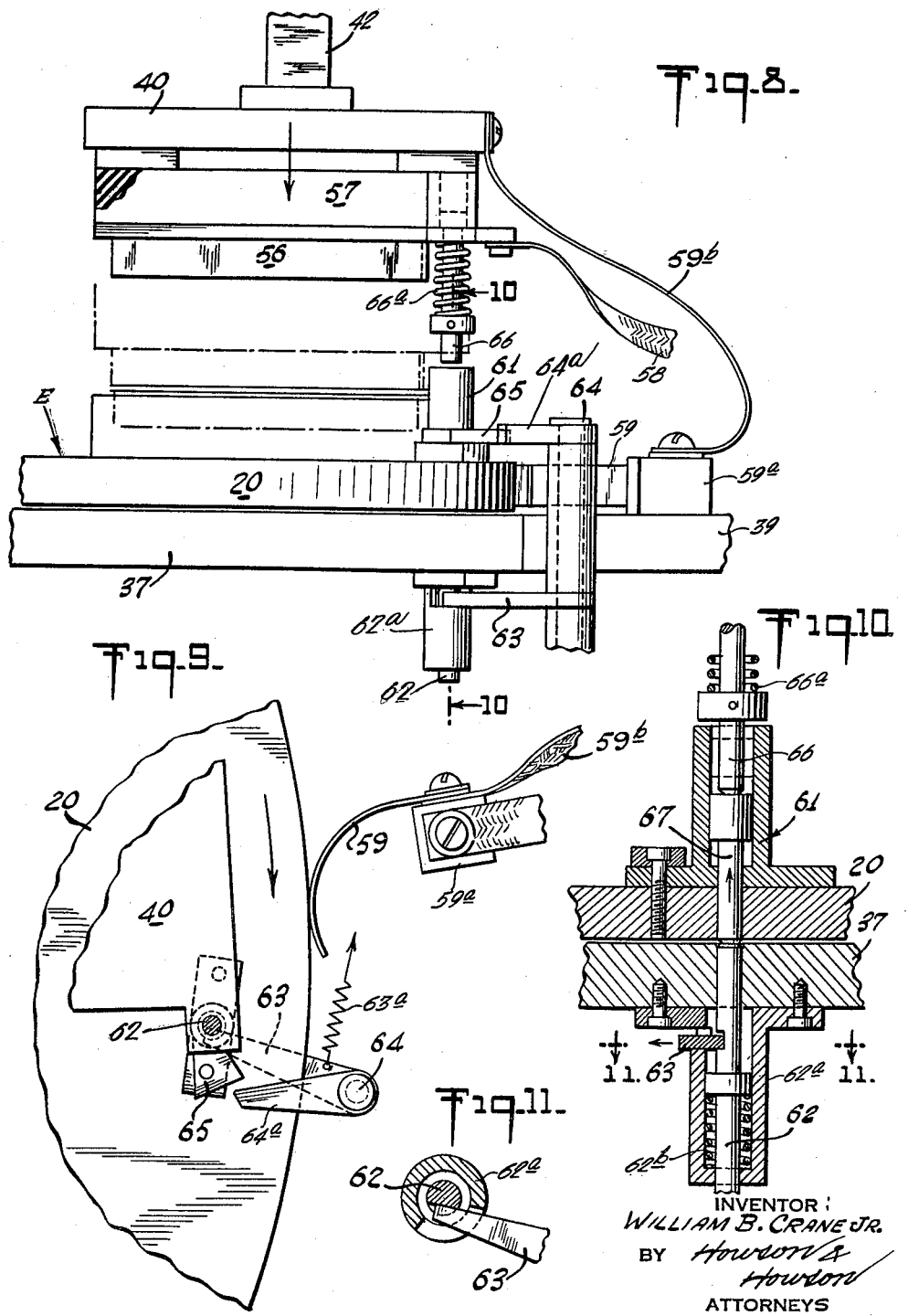

July 20, 1965 W. B. CRANE, JR 3,195,284
APPARATUS AND METHOD FOR FORMING AND CLOSING A DISPLAY PACKAGE
Filed Jan. 20, 1964 6 Sheets-Sheet 4
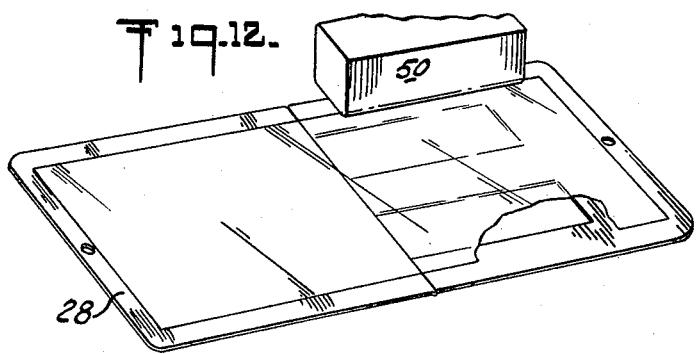
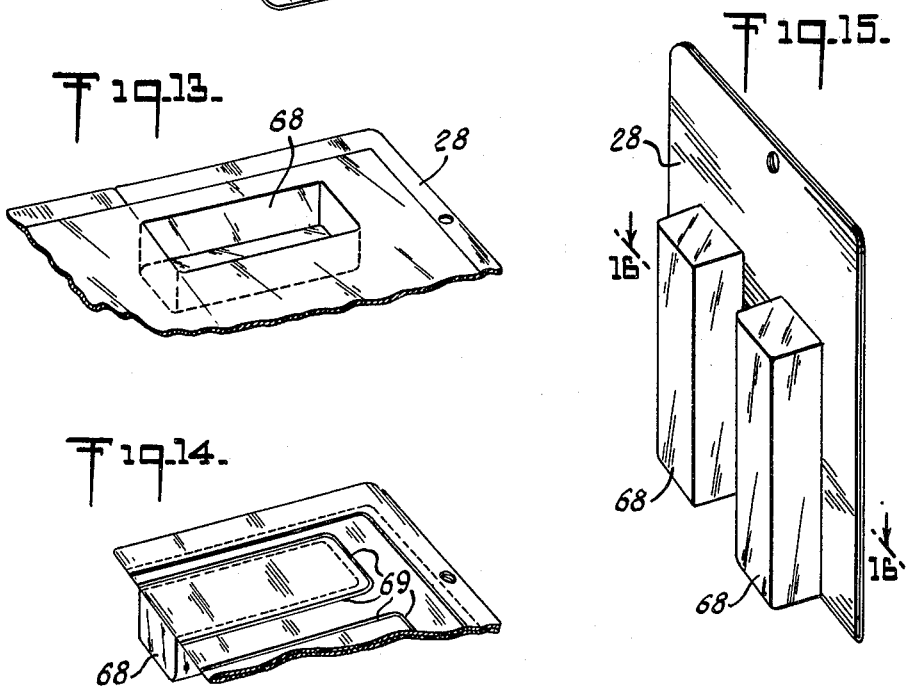
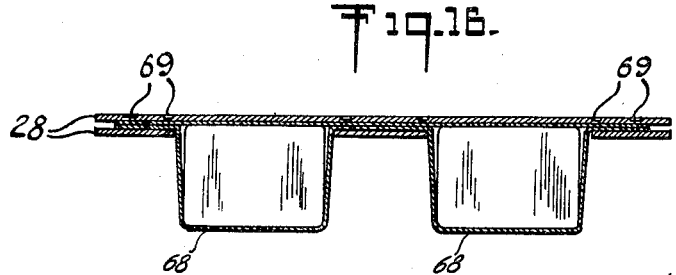
INVENTOR:
WILLIAM B. CRANE JR.
BY Howson &
Howson
ATTORNEYS July 20, 1965 W. B. CRANE, JR 3,195,284
APPARATUS AND METHOD FOR FORMING AND CLOSING A DISPLAY PACKAGE
Filed Jan. 20, 1964 6 Sheets-Sheet 5

INVENTOR:
WILLIAM B. CRANE JR.
BY Howson & Howson
ATTORNEYS

United States Patent Office 3,195,284
Patented July 20, 1965

3,195,284
APPARATUS AND METHOD FOR FORMING
AND CLOSING A DISPLAY PACKAGE
William B. Crane, Jr., New York, N.Y., assignor, by mesne assignments, to United Shoe Machinery Corporation, Boston, Mass., a corporation of New Jersey
Filed Jan. 20, 1964, Ser. No. 338,956
9 Claims. (Cl. 53—30)

This application is a continuation-in-part of application Serial No. 856,961, filed December 3, 1959, now abandoned.

This invention relates to apparatus and method for forming and closing a display package having a supporting frame and a plastic window which is formed and sealed around an article and has for an object the provision of improvements in this art.

The present invention assumes that there is a supply of flat blanks each comprising a supporting frame of relatively heavy rigid material each with a window opening which is covered by a sheet of heat-formable clear plastic material which is shaped to receive an article and sealed after the article has been placed in a pocket formed in the plastic material in the window. The plastic sheet is adherently secured around the sides of the window and may, if desired, cover the entire area of the blank. One great advantage of the present development is that the blank may have all printing applied thereto and in other respects be entirely completed so that when the operations of the present invention have been performed there is produced a final package ready for the market. Obviously, it would be very difficult to print or otherwise process the package in any ordinary commercial equipment after the pocket has been formed and the article sealed therein.

In a specific form, the blank is made of a piece of line-weakened foldable paperboard or cardboard with window openings and having glued on the unprinted surface thereof a sheet of heat-formable clear plastic material, the plastic sheet having a pocket formed therein in the window opening and the blank being folded over the article placed in the pocket and sealed. There may be one or more plastic windows on either one or both sides of the article.

There are a number of plastic sheet materials which can be heat-formed and which will hold a rigid shape immediately after formation, vinyl chloride being one which is often used and the one which is particularly considered in the present disclosure. This material has a characteristic which is known as elastic memory which gives it the ability to shrink when reheated to change from its previous rigid shape to a smaller shape which tightly embraces the article and, while the present apparatus and method do not specifically include this after-shrinking step, they do provide a sealed package which can readily be subjected to the final shrinking operation.

When the package of the type here considered is closed over the article the doubled plastic sheet is on the inside and the paperboard covers the plastic sheets on both sides. The plastic material is of such a nature that it is self bonding with heat. It is desirable to seal the plastic layers together around the sides of the window where covered by the paperboard; and it is usually desirable to seal the plastic layers together around the article in the window where the plastic is bare on at least one side.

If a usual hot plate heating device is used it requires a very considerable time to heat the plastic through the paperboard and may, in fact, burn or deface the surface (with printing, etc.) of the paperboard before the plastic is heated to the bonding point. Even if the plastic sheets beneath the paperboard covering should heat properly, the time required relative to the time required to perform the other operations at the other stations would be so great that there would be a great economic loss in operation.

When both bare and covered portions of the plastic material are to be heated at one time, the use of a hot iron becomes practically impossible because the bare areas will burn through before the covered areas are heated to the bonding temperature.

According to the present invention the sealing operation is accomplished by induction heating means which acts through the paperboard covering as if it were transparent to the heating effects so that the bonding temperature of the covered area is reached very rapidly. Moreover, the covered and bare areas are brought up to bonding temperature at substantially the same time so that there is neither time delay nor marred material.

It is, therefore, a particular object of the invention to provide a sequential process for forming pockets in plastic windows of flat blanks and sealing the packages which is rapid and economical and free from injury to material; and to provide efficient and economical apparatus for effectuating the process.

Another object is to provide apparatus and process which will substantially avoid heating the blank in the pocket forming stage except at the window so that the bond between the plastic and frame outside around the window is not impaired.

The above and other objects of the invention, as well as various features of novelty and advantages, will be apparent from the following description of an exemplary embodiment, reference being made to the accompanying drawings, wherein:

FIG. 1 is a somewhat schematic top plan view of a turntable station-action type of machine embodying the invention;

FIG. 2 is a side elevation of the parts shown in FIG. 1;

FIG. 3 is an enlarged vertical section taken on the line 3—3 of FIG. 1, showing the parts at the pocket forming station;

FIG. 4 is an enlarged section of a lower portion of FIG. 3, showing a pocket being formed in the plastic sheet of a window;

FIG. 5 is a view like FIG. 4 but showing the fully formed pocket;

FIG. 6 is a vertical section taken on the line 6—6 of FIG. 3;

FIG. 7 is an enlarged vertical section of parts shown near the top of FIG. 6;

FIG. 8 is an enlarged side elevation of the parts at the sealing station shown at the right hand side of FIGS. 1 and 2;

FIG. 9 is a fragmentary top plan view of parts shown in FIG. 8;

FIG. 10 is an enlarged partial vertical section taken on the line 10—10 of FIG. 1;

FIG. 11 is a horizontal section taken on the line 11—11 of FIG. 10;

FIG. 12 is a perspective view of a flat blank just prior to the start of the pocket forming action;

FIG. 13 is a partial perspective view of a blank with a pocket formed therein;

FIG. 14 is a partial perspective view like FIG. 13, but showing a completed package;

FIG. 15 is a perspective view of the pocket side of a completed package;

FIG. 16 is a section taken on the line 16—16 of FIG. 15;

Figure 17:
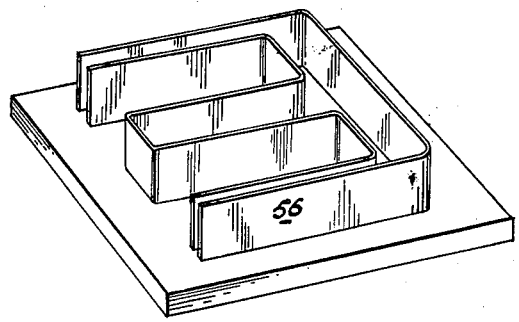
FIG. 17 is a perspective view of the sealing die.

As shown in FIGS. 1 and 2, the apparatus comprises a rotary station-stop turntable 20 mounted on a base 21, the table being rotated intermittently by a power device 22 acting through its pinion 23 upon a gear 24 secured to the turntable.

The machine shown is a six station device so the turntable is provided with six equally spaced pocket-forming molds 26 and blank holders which are arranged to stop successively at a loading station A, a plastic sheet-heating station B, a pocket-forming station C, an article charging and covering station D, a sealing station E, and an unloading station F.

A serving table 27 is provided alongside the turntable at the feeding station A for holding a stack of flat blanks 28 in a convenient position to be fed into blank holders 29 on the turntable.

At the window heating station B a hot plate heater 31, preferably electric resistor heated, is mounted on radial tracks 32 and moved in or out by a power piston 33 when desired, as to be moved out to avoid overheating a blank in case the turntable movement is stopped for a time longer than the normal blank heating period. Preferably only the space above a window opening is heated, keeping the plastic sheet where glued to the frame free from heat in order to preserve the bond.

At the pocket forming station C, to which blanks are turned immediately after being heated at station B, there is provided a vertically reciprocable plug assist device, generally designated by the numeral 34, this part of the pocket-forming mechanism being mounted on an overhead beam-like support 35 carried at one end on vertical frame elements 36 secured to a lower frame element 37, and the other end of the support 35 being carried on a heavy vertical frame element 38 at the sealing station. The frame elements 37 and 38 are mounted on a strong base frame 39, as shown in FIGS. 1 and 2.

At the sealing station E there is a vertically reciprocable sealing device, generally designated by the numeral 40, and a turntable escapement and locking device, generally designated by the numeral 41.

FIGS. 3–7 disclose details of the pocket forming mechanism at station C. Below each mold 26 there is a vacuum chamber 43 evacuated by a tube in its bottom at proper controlled times and connected by apertures 44 with the pocket forming cavity or cavities 45 of the mold. Guide rods 47 mounted in guides supported on the overhead beam 35 guide a plug assist device 48 having one or more plugs 50 of the proper shape and size to enter a cavity 45 and, aided by suction below, to form a pocket in the plastic sheet in a window of the blank frame. The plug assist device 48 is operated by a power device 52 having a piston rod 52a rigidly connected to the plug assist device 48 which is in the nature of a crosshead. The rods 47 are slidable in the device 48 and thereabove are secured to a transverse member 51 which is urged downward on the piston rod 52a by a spring 53. At the lower end the rods 47 carry a blank hold-down plate 55 which engages the blank frame but leaves the window space clear for entry of the plugs 50 which pass through holes in the plate 55 after it is seated on the blank. FIG. 4 shows the position of parts when a pocket is almost completed. FIG. 5 shows the pocket after completion. Heating means 54 are provided for the plug assist device 48 to keep the plugs at the proper operating temperature.

The sealing apparatus 40 at station E, as shown in FIGS. 8–11, includes a piston rod 42 which carries a metallic die 56. The die alone, for the particular package illustrated, is shown in FIG. 17. Specifically, the die 56 is carried on a block 57, as of wood or other suitable insulating material, and is connected to the positive terminal of a high-frequency circuit by a lead 58. The turntable 20 is electrically connected by a brush 59 engaging the side of the turntable to a grounded terminal block 59a; and a cable 59b connects the upper metallic part of the sealing device 40 to the grounded block 59a. By this arrangement current is caused to pass through the thickness of the package when clamped on the turntable by the die.

When a package reaches the sealing station E a pocket has been formed in the plastic sheet in such window or windows as may be provided; an article has been placed in the pocket; and a paperboard-plastic covering layer has been placed over the article, with the plastic sheet of the covering layer lowermost and the paperboard sheet uppermost. This places plastic sheets together on the inside and the paperboard layers on the outside. The plastic sheets will fuse together when heated but they must be heated through the paperboard layers which cover the plastic sheets around the sides of the window. Within the window opening it may also be required that the bare plastic sheets shall be fused together where they are not covered by the paperboard layers. According to the present invention, the heating through the paperboard covering layers is accomplished by using high electronic frequency current. This heats within the short time allowed to keep pace with the operations performed at the other stations. Furthermore, the bare and covered portions of plastic can by such means be heated in substantially the same length of time.

FIGS. 12–16 show the package in various stages of formation. In FIG. 12 the blank 28 is shown when it is about to have an assist plug 50 engage the plastic sheet in a window after the portion within the window has been heated at station B. FIG. 13 shows a pocket 68 which has been formed in the plastic sheet in the window opening. FIG. 14 shows a portion of a final package after an article has been placed in a pocket, covered by a flat panel, and sealed. If there are to be companion opposite pockets to enclose an article they will be disposed in opposed relationship. In the simple blank shown in FIG. 1 the pocket is formed in the outer end of the blank and the flat inner end of the blank is folded over the article in the pocket at station D. The inner sealing lines are indicated at 69 (FIG. 4). The outer sealing lines around the window are indicated by dotted lines. FIG. 15 shows the completed package as seen from the side with the article-containing pockets. When there are paired opposed pockets the other side would look the same. FIG. 16 in section shows how the plastic sheets are sealed together around the article.

Exact registry between movable and fixed parts at all stations is desired, particularly at the pocket-forming and sealing stations. Means are hereby provided for automatically attaining the desired exact registry. This means is located at and associated with the mechanism at the sealing station. It is shown in FIGS. 8–10. Here a locking device 61 provided for each station on the turntable 20 carries a slidable pin 67 which, when the turntable is halted, registers with the end of a detent pin 62 slidably mounted in a suitable housing 62a on the fixed frame part 37 and urged upward by a spring 62b. A latch arm 63, mounted on a vertical pivot pin 64 and urged into engaging position by a spring 63a, passes through a slot in the housing 62a and engages in a notch in the detent pin 62. At its upper end the pivot pin 64 has an operating arm 64a adapted to be engaged by a tripping element 65 on the turntable (one for each position) as the package approaches the sealing position to release the latch arm 63 and allow the pin 62 to be forced up by the spring 62b.

When a hole in the turntable—one of those occupied by a pin 67—reaches proper position the lower detent pin 62 will move up and enter it, forcing the upper pin 67 upward out of the way. This locks the turntable securely in position while the operations at the several stations are performed.

When the sealing device 40 descends a slidable release pin 66, carried thereby and urged down by a spring 66a, engages the end of pin 67 and through it forces the detent pin 62 out of holding position. This allows the latch 63 to be re-engaged to hold the detent pin 62 down clear of the turntable. The sealing device itself, when in the lower position, holds the turntable in position until the sealing device has lifted. The timing is such that by that time the operations at the other stations have been completed. The pin 66, of course, aids in holding against turntable turning and is the last part to be separated before the turntable turning mechanism acts.

Figure 18:
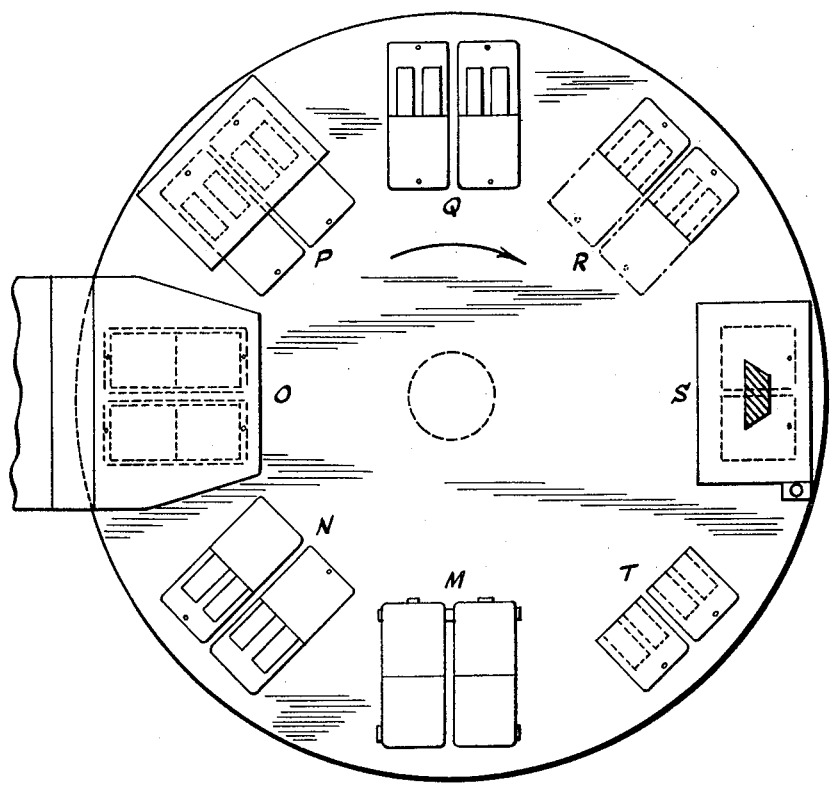
FIG. 18 is a top plan view similar to FIG. 1 showing an alternative turntable arrangement.

FIG. 18 shows a modified arrangement which is adapted to handle two blanks at each station and which provides two stations for loading and enclosing articles and two stations for loading blanks. Thus there are two loading stations M and N, and window heating station O, a pocket forming station P, two article loading and enclosing stations Q and R, a sealing station S, and an unloading station T. Blanks have been loaded at the second blank loading station N. Articles have been inserted at station Q and have been covered at station R.

Figure 19:
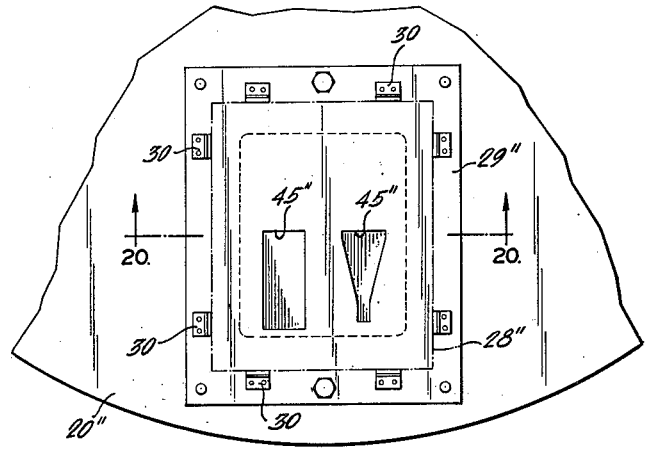
FIG. 19 is a partial enlarged plan view showing a flat blank secured in a holder.
Figure 20:
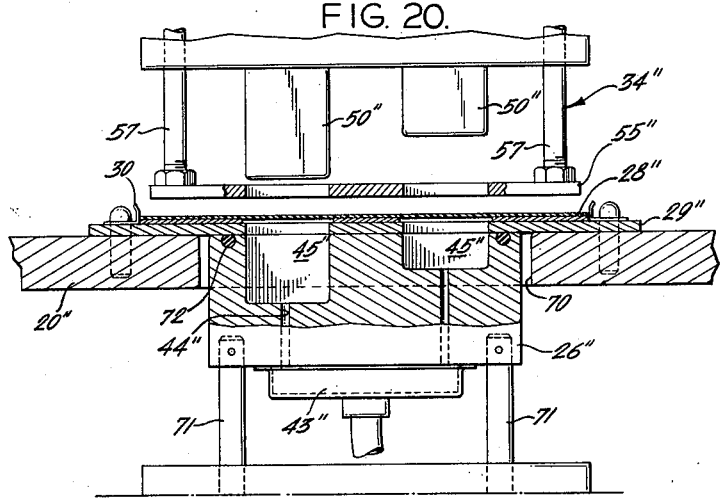
FIG. 20 is a view similar to FIG. 3 but showing more detail and illustrating how pockets of different depth are formed.

FIGS. 19 and 20 show a modification in which the turntable 29" is provided with a plurality of holes 70 instead of a mold at each position on the turntable, a single reciprocable mold 26" being provided at the pocket forming station. The mold is mounted on power operated lift rods 71 and is raised each time a station hole stops above it. A seal 72 around the mold cavities 45" engages beneath a blank holder plate 29" to hold the vacuum seal. A vacuum chamber 43" and apertures 44" to the pocket-forming cavities 45" are provided as before. A plug assist device 34" with plugs 50", one deeper than the other to match the cavities 45", are mounted for vertical movement; and a blank hold-down plate 55" carried by guide rods 47" holds a blank 28" down while pockets are being formed.

FIGS. 19 and 20 show the blank holders 29" more clearly than the other views. Here it is seen that spring clips 30 are provided in sufficient number to hold the blank securely, whether flat or folded, or to hold a cover blank, if applied, instead of folding.

Figure 23:
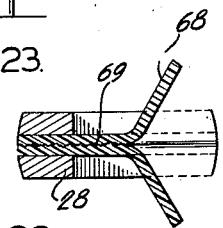
FIG. 23 is a further enlarged partial section taken in the area 23 of FIG. 22.
Figure 21:
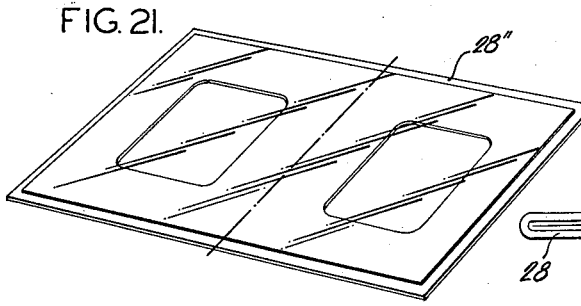
FIG. 21 is a perspective view of a different form of blank.
Figure 22:
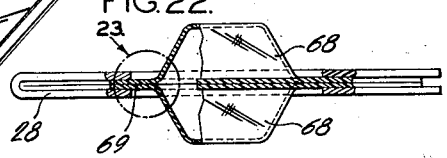
FIG. 22 is an enlarged section taken on the line 22—22 of FIG. 21.

FIGS. 21–23 show how pockets 68 may be formed in a blank or blanks to cover both sides of an article and how the plastic sheets are fused together at both bare and covered areas. Electronic high frequency dielectric induction heating hereby provided is particularly adapted to make bare and covered seals simultaneously and to accomplish this within the time allowed to keep pace with the other operations on the blank being performed at the other stations. Frequencies between 20 and 100 megacycles have been found suitable for present purposes, 27 to 30 megacycles most convenient at present.

It is thus seen that the invention provides improved apparatus and method for forming and closing display packages having pockets formed in heat-deformable heat-fusible material where heating of covered or bare plastic material must be accomplished and that in step with the other operations which are performed on the blanks. This not only makes the necessary operations feasible but provides an economical cycle of operations.

While certain embodiments of the invention have been described for purposes of illustration it is to be understood that there may be various embodiments and modifications within the general scope of the invention.

I claim:

1. Apparatus for forming and sealing article-holding pockets in plastic windows of pre-shaped paperboard blanks having window openings covered on one side of the paperboard by a plastic sheet which is deformable when heated and which is subject to being bonded together when heated, comprising in combination, a blank carrier provided with a plurality of blank holders and pocket-receiving openings at a plurality of station positions along the carrier, the blank holders fitting the blanks and holding them with the plastic sheet uppermost, said carrier being movable intermittently to place a blank carried by a holder successively at a blank loading station, a window heating station, a pocket forming station, an article loading and covering station, a sealing station, and an unloading station, means for holdig the carrier to present the blanks in fixed position at the stations, means at the window heating station for heating the plastic sheet in the window opening, means at the pocket forming station for forming a pocket in the heated plastic window, the formed pocket extending through the window of the paperboard blank, an article being placed in the formed pocket at the article loading station and the article being covered by a cover having a plastic sheet engaging the plastic sheet around the pocket and a cardboard layer thereabove, at least around the sides of the pocket therebelow, and means at the sealing station for rapidly heating the interior surface-engaging sheets of plastic material between the paperboard layers, said sealing means including a die heating the plastic by high frequency electric current movable into engagement with the package formed from the blank at the places where the plastic sheets are to be heated to fuse-bond them together through the paperboard covering without injury to the paperboard covering and to keep pace with the window-heating action and pocket-forming action.

2. Apparatus for forming and sealing article-holding pockets in the plastic windows of pre-shaped paperboard blanks having weakened fold lines and window openings in the end on at least one side of the fold line, deformable heat-bondable plastic material covering the blank on the upper side and forming windows over the window openings, comprising in combination, a blank carrier provided with a plurality of blank holders at a plurality of station positions along the carrier, the blank holders fitting the blanks and holding them with the plastic sheet uppermost, said carrier being intermittently movable to position blanks carried by holders successively at a blank loading station, a window heating station, an article loading and blank folding station, a sealing station, and a package unloading station, means for holding the carrier to present the blanks in fixed position at the stations, means at the window heating station for heating the plastic sheet in the window opening, means at the pocket forming station including a vacuum pocket recess and a reciprocating plug assist device for forming a pocket in each window provided in the blank, the formed pocket extending through the window of the paperboard blank, an article being place in each window pocket at one end of the blank and covered by folding over the other end of the blank at the article loading station, the blank when folded forming a package with plastic sheets in contact with each other on the inside and covered by paperboard on the outside except where pockets are formed in windows, and means at the sealing station for rapidly heating the interior surface-engaging sheets of plastic material at least around window openings where the plastic material is covered by paperboard, said sealing means including a die which heats the plastic by high frequency electric current movable into engagement with the package at the places where the plastic sheets are to be heated to fuse-bond them together through the paperboard covering without injury to the paperboard covering and to keep pace with the window-heating action and pocket-forming action.

3. Apparatus as set forth in claim 2, in which said high frequency heated die is provided with elements for sealing the plastic sheets together around the pockets within the window opening as well as around the outer sides of the window where the plastic sheets are covered by the paperboard sheets.

4. Apparatus as set forth in claim 1, in which said pocket forming means comprises a vertically movable mold having a vacuum recess to form the pocket and means forming a seal around a pocket opening in the carrier when the mold is raised.

5. Apparatus as set forth in claim 1, in which said means for holding the carrier in fixed station positions comprises a detent pin at the sealing station, means co-operating with said carrier to release the detent pin as a blank approaches the sealing station, and means actuated with said sealing means for releasing the carrier from the detent pin when the heating die is brought down into seal forming position.

6. The method of forming and sealing article holding pockets in plastic windows of paperboard blanks having window openings covered on one side by a plastic sheet which is deformable when heated and which is subject to being fused together with heat, which comprises, heating the plastic window, forming a pocket in the plastic window of one window while the next blank window is being heated, inserting an article in the formed pocket, covering the pocket and blank with a blank element having a plastic sheet and a paperboard backing with the plastic sheet engaging the plastic sheet of the blank around the pocket and the paperboard backing disposed thereabove, and thereafter fuse-bonding the plastic sheets together beneath the paperboard covering by electrical induction heating of the plastic sheets which acts rapidly to heat-fuse the plastic sheets together beneath the paperboard covering without injury to the covering and to keep pace with the window heating step and the pocket forming step.

7. The method as set forth in claim 6, in which said blank element which covers the pocket and article is formed as a foldable part of the blank which is folded over the pocket after the article has been inserted.

8. The method as set forth in claim 6, in which the high frequency sealing heat is applied simultaneously to covered and bare portions of the plastic sheets to be fuse-bonded together around a pocket.

9. Apparatus for forming and sealing article-holding pockets in plastic windows of pre-shaped paperboard blanks having window openings covered on one side of the paperboard by a plastic sheet which is deformable when heated and which is subject to being bonded together when heated, comprising in combination, a blank carrier provided with a plurality of blank holders and pocket-receiving openings at a plurality of station positions along the carrier, the blank holders fitting the blanks and holding them with the plastic sheet uppermost, said carrier being movable to place a blank carried by a holder successively at a window heating station, a pocket forming station, an article loading and covering station, a sealing station, and an open access station, means for holding the carrier to present the blanks in fixed position at the stations, means at the window heating station for heating the plastic sheet in the window opening, means at the pocket forming station for forming a pocket in the heated plastic window, the formed pocket extending through the window of the paperboard blank, an article being placed in the formed pocket at the article loading station and the article being covered by a cover having a plastic sheet engaging the plastic sheet around the pocket and a cardboard layer thereabove, at least around the sides of the pocket therebelow, and means at the sealing station for rapidly heating the interior surface-engaging sheets of plastic material between the paperboard layers, said sealing means including a die heating the plastic by high frequency electric current movable into engagement with the package formed from the blank at the places where the plastic sheets are to be heated to fuse-bond them together through the paperboard covering without injury to the paperboard covering and to keep pace with the window-heating action and pocket-forming action.

References Cited by the Examiner
UNITED STATES PATENTS

| 2,514,028 | 7/50 | Cloud | 53—141 X |
| 2,896,387 | 7/59 | Brock | 53—184 X |
| 3,000,157 | 9/61 | Ollier et al. | 53—184 |
| 3,035,382 | 5/62 | Lemelson | 53—184 |
| 3,075,329 | 1/63 | Swezey et al. | 53—30 X |
| 3,075,330 | 1/63 | Swezey et al. | 53—30 X |

FRANK E. BAILEY, *Primary Examiner.*
TRAVIS S. McGEHEE, *Examiner.*